United States Patent [19]

Fuller et al.

[11] Patent Number: 5,090,115
[45] Date of Patent: Feb. 25, 1992

[54] GROMMET INSERTION APPARATUS

[75] Inventors: Jack J. Fuller; Joseph A. Podesta; Daniel J. Yarnold, all of Memphis, Tenn.

[73] Assignee: Carrier Corporation, Syracuse, N.Y.

[21] Appl. No.: 716,162

[22] Filed: Jun. 17, 1991

Related U.S. Application Data

[62] Division of Ser. No. 248,057, Sep. 23, 1988, Pat. No. 5,052,096.

[51] Int. Cl.$^5$ .............................................. B23P 21/00
[52] U.S. Cl. ...................................... 29/789; 29/771; 29/787; 29/235
[58] Field of Search .................. 29/771, 785, 786, 787, 29/789, 809, 822, 823, 235

[56] References Cited

U.S. PATENT DOCUMENTS

| | | |
|---|---|---|
| 2,357,139 | 8/1944 | Sene . |
| 3,497,940 | 3/1970 | Wise ............................... 29/789 |
| 4,183,132 | 1/1980 | Nagashima et al. .................. 29/451 |
| 4,765,048 | 8/1988 | Hokanson ............................ 29/235 |

Primary Examiner—P. W. Echols
Assistant Examiner—David P. Bryant

[57] ABSTRACT

Apparatus is provided for the automated insertion of elastomeric grommets in the legs of a compressor base. The holes in each of the compressor legs are aligned with respective discharge ends of guide cylinders which function to receive the grommets and to force them upwardly through a converging portion thereof to deform a head portion sufficiently such that it passes through the compressor leg hole and is then allowed to spring back to its original shape to secure the grommet within the hole. Provision is also made for assisting the removal of the remaining portion of the grommet from the guide cylinder by a push rod which engages the base of the compressor at the same time that the grommet head passes through the leg opening, such that the entire compressor is moved upwardly to pull the grommet body from the converging portion of the guide cylinders.

11 Claims, 3 Drawing Sheets

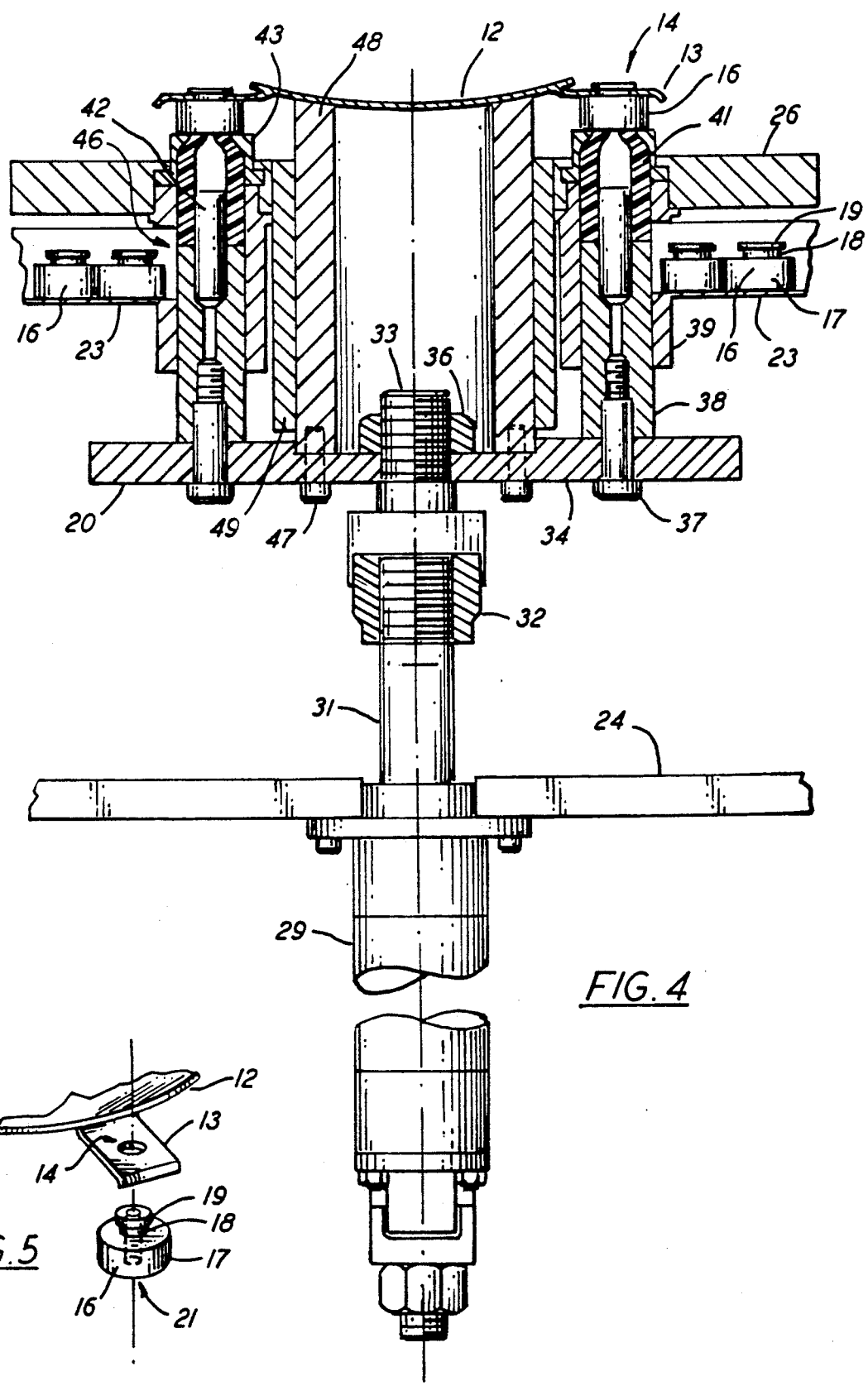

GROMMET INSERTION APPARATUS

This application is a division of application Ser. No. 248,057, filed Sept. 23, 1988, now U.S. Pat. No. 5,052,096.

BACKGROUND OF THE INVENTION

This invention relates generally to a compressor assembly process and, more particularly, to a method and apparatus for installing elastomeric grommets in the base of a compressor.

It is customary in the design of air conditioning systems to mount the refrigerant compressor to the base pan of the condensing or outdoor unit. In such an installation, it is desirable to dampen the vibrations that are caused by operation of the compressor. This is generally accomplished with elastomeric grommets that are placed between the base of the compressor and the base pan to which it is mounted. Since the mounting bolts can also act to transfer these vibrations to the base pan, it is preferable that the elastomeric grommets pass through the openings in the base of the compressor and include a collar or head on the upper end thereof such that when the mounting bolts are placed through the center of the grommets, the head of the mounting bolts rests on the elastomeric collar of the grommet. In this way, the compressor is entirely isolated from any metal-to-metal connection between the compressor base and the base pan.

Heretofore, elastomeric grommets were manually inserted into the mounting holes of the compressor base assembly. This was recognized as being labor intensive and a time consuming process, since only a single grommet was installed at a time. Further, when performed in this manner, the process tends to be arduous for the installer since the grommets are preferably sized so as to have a tight fit relationship within the compressor base.

It is therefore an object of the present invention to provide an improved method and apparatus for the installation of elastomeric grommets into compressor base openings.

Another object of the present invention is the provision for reducing the time that is required for installing elastomeric grommets into compressor base openings.

Yet, another object of the present invention is the provision for a method and apparatus for installing grommets into compressor base openings in an automated fashion.

Still another object of the present invention is the provision for installing elastomeric grommets into a compressor base opening in an economical and efficient manner.

These objects and other features and advantages become more readily apparent upon reference to the following description when taken in conjunction with the appended drawings.

SUMMARY OF THE INVENTION

Briefly, in accordance with an aspect of the invention, the compressor base is placed over one end of a guide cylinder, with its opening in axial alignment with a discharge opening of the cylinder. Provision is made to insert an elastomeric grommet into the cylinder, with its head toward the discharge end. A piston is then made to move upwardly into the cylinder so as to engage the bottom of the grommet and force it upwardly into a contracting portion wherein the grommet head is deformed so as to allow its entry first into the diminished cylinder discharge opening and then through the compressor base opening, after which the head expands to its undeformed condition to thereby capture the grommet in the base opening.

By another aspect of the invention, a push rod is caused to engage the compressor base, at substantially the same time that the grommet head emerges through the compressor base opening, such that continued movement of the push rod against the compressor base causes the compressor base to be lifted from the guide cylinder and to thereby assist the piston in forcing the remaining portion of the elastomeric grommet through the converging and discharge opening portions of the cylinder.

In accordance with another aspect of the invention, the grommets are fed, one by one, into the cylinder by way of a side chute, with the grommets entering in a direction normal to the cylinder axis, and with their heads oriented in the desired upward direction. The piston is in a retracted position below the chute when the grommet enters the cylinder, and then moves upwardly to engage the grommet and force it upwardly within the cylinder.

By yet another aspect of the invention, a plurality of cylinders are provided so as to simultaneously install a plurality of grommets in their associated compressor base openings. The pistons are attached to a common pusher plate so as to be moved in unison. Further, the pusher plate is also attached to the push rod so as to synchronize the piston movement with the push rod movement.

In the drawings as hereinafter described, a preferred embodiment is depicted; however, various other modifications and alternate constructions can be made thereto without departing from the true spirit and scope of the invention.

BRIEF DESCRIPTION OF THE DRAWINGS

FIG. 4 is a front sectional view thereof with the piston assembly being in the raised position.

FIG. 5 is a segmented perspective view of the grommet and its associated compressor base leg.

DESCRIPTION OF THE PREFERRED EMBODIMENT

Figure 1:
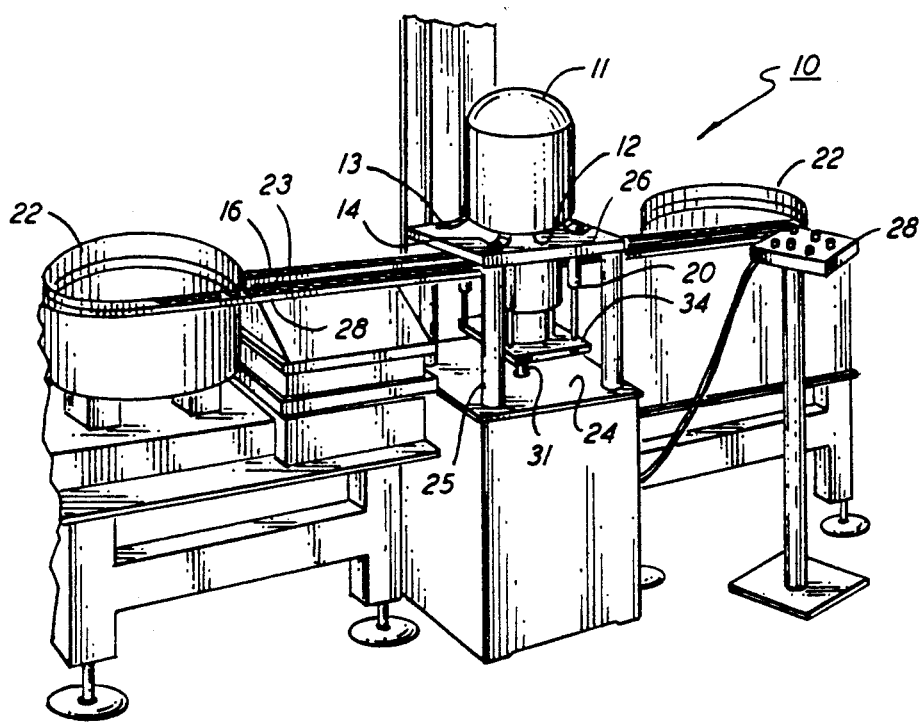
FIG. 1 is a perspective view of the apparatus of the present invention.

Referring now to FIG. 1, the invention is shown generally at 10 as applied to a compressor 11 having a base 12 with a plurality of outwardly extending legs 13 with each having an opening or mounting hole 14 formed therein. The apparatus is useful for simultaneously installing elastomeric grommets 16 in each of the mounting holes 14 in an automated fashion.

The grommet 16, which is shown in FIGS. 1-5, has a body 17, a neck 18, and a head 19 as will be seen in FIG. 5. A cylindrical bore 21 is formed at an axis for receiving a mounting bolt (not shown) therein. When installed, the grommet is inserted into the leg 13, with the body 17 below, the neck 18 within the opening 14, and the head 19 above the leg 13 The mounting bolt then passes through the bore 21 and the leg 13 where it is attached to the base pan of the system.

Referring again to FIG. 1, a pair of tumbler hoppers 22 on either side of the grommet insertion machine are provided to systematically orient and feed the grommets into four chutes 23 where they are conveyed on a somewhat continuous basis toward the grommet insertion machine 20 in an upright disposition. The grommet insertion machine 20 has a base platform 24, a plurality of connecting posts 25, and a top platform 26, with the operational portion of the grommet insertion machine 20 being disposed between the bottom platform 24 and the top platform 26, and the compressor 11 being temporarily placed with its legs 13 on the top platform 26 as shown. The grommet insertion machine 20 is controlled by an operator from the control stand 28 shown in FIG. 1.

Figure 3:
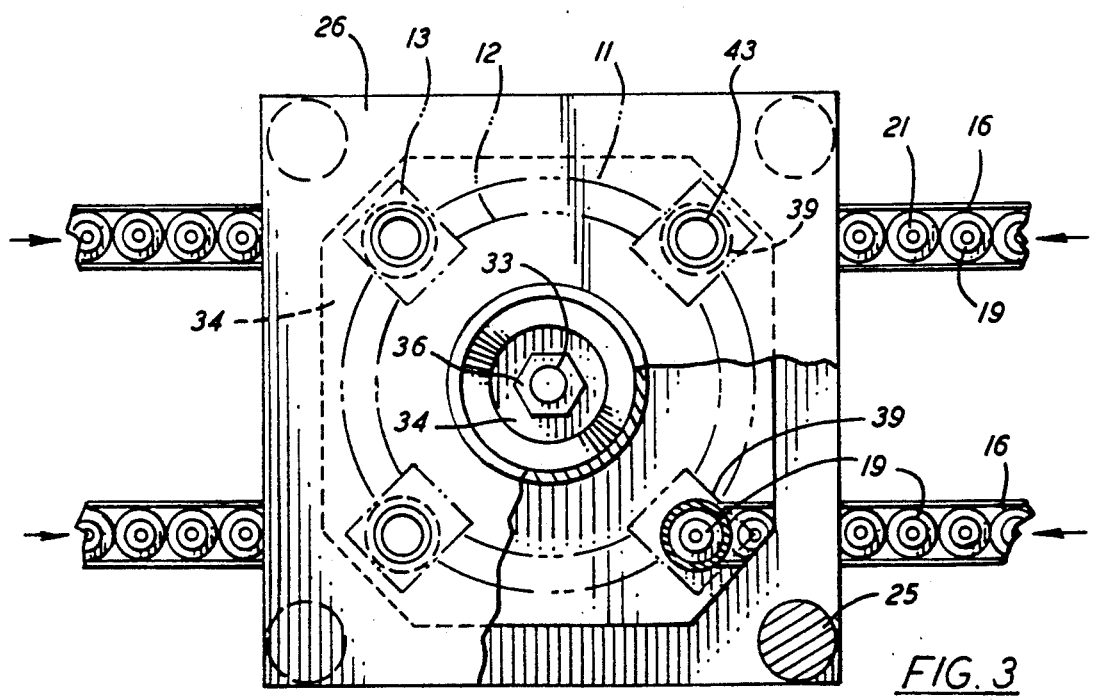
FIG. 3 is a top view thereof with a portion broken away to show structural detail.

Referring now to a grommet insertion machine 20 portion of the apparatus, as shown in detail in FIGS. 2, 3, and 4, there is provided below the bottom platform 24, a hydraulic cylinder 29 with an upwardly extending piston 31 with its associated coupling 32 and shaft 33. The shaft 33 is rigidly connected to a pusher plate 34 by a nut 36. Attached to the pusher plate 34 by bolts 37 are four plungers 38 that cooperate with associated guide cylinders 39, which are rigidly mounted to the top platform 26 for slideably receiving the plungers 38 and their plunger extensions 41 therein. The plunger extensions 41 are rigidly linked to the plungers 38 by way of central connecting shafts 42. The plunger extensions 41 are preferably made of a flexible low frictional material, and the inner walls of the guide cylinders 39 are preferably polished to minimize the friction in the sliding contact between the two elements At the top of each of the guide cylinders 39 is a grommet funnel 43 whose inner diameter converges from one which is slightly larger than the outer diameter of the plunger extensions 41 to that of a substantially smaller discharge opening 44. It is this component which functions to deform the grommet head 19 sufficiently for insertion into the compressor legs 13 when they are placed on top of the grommet funnel 43 with their mounting holes 14 registering with the associated discharge openings 44 as shown in FIG. 2.

Formed in the sides of each of the guide cylinders 39 is a side opening 46 which registers with the respective chutes 23 for sequentially receiving the individual grommets 16 into the respective guide cylinders. In FIG. 2, the piston 31 is shown in the fully downward position such that the pusher plate 34 and the associated plungers 38 are also in their fully downward positions. The plunger extensions 41 are therefore below the side openings 46, thus allowing the grommets 16 to be inserted into the guide cylinders 39. After the grommets have been inserted into the guide cylinders 39, the plungers 38 push them upwardly into the respective grommet funnels 43, where the grommet heads 19 are deformed to the smaller size of the discharge openings 44 so that they can easily fit into the mounting holes 14 of the compressor base legs 13. At that point, the plunger extensions 41 continue to move upwardly in the cylinders 39, being somewhat temporarily deformed themselves in the process, to push the body portions 17 of the grommet 16 through the converging grommet funnels 43 until they have passed entirely therethrough, at which point they are secure within the compressor base legs 13 and free from the grommet insertion machine. To assist in this latter portion of the process, a further structure is included as follows.

Also attached to the pusher plate 34 by a plurality of bolts 47 is a central inner cylinder or guide rod 48 which extends upwardly and is slideably received in a central outer cylinder 49 which is supported by the top platform 26. The mating cylinders tend to maintain the position of the pusher plate 34 with respect to the top platform 26, and also to assist in the disengaging portion of the grommet insertion process which will now be described.

Figure 2:
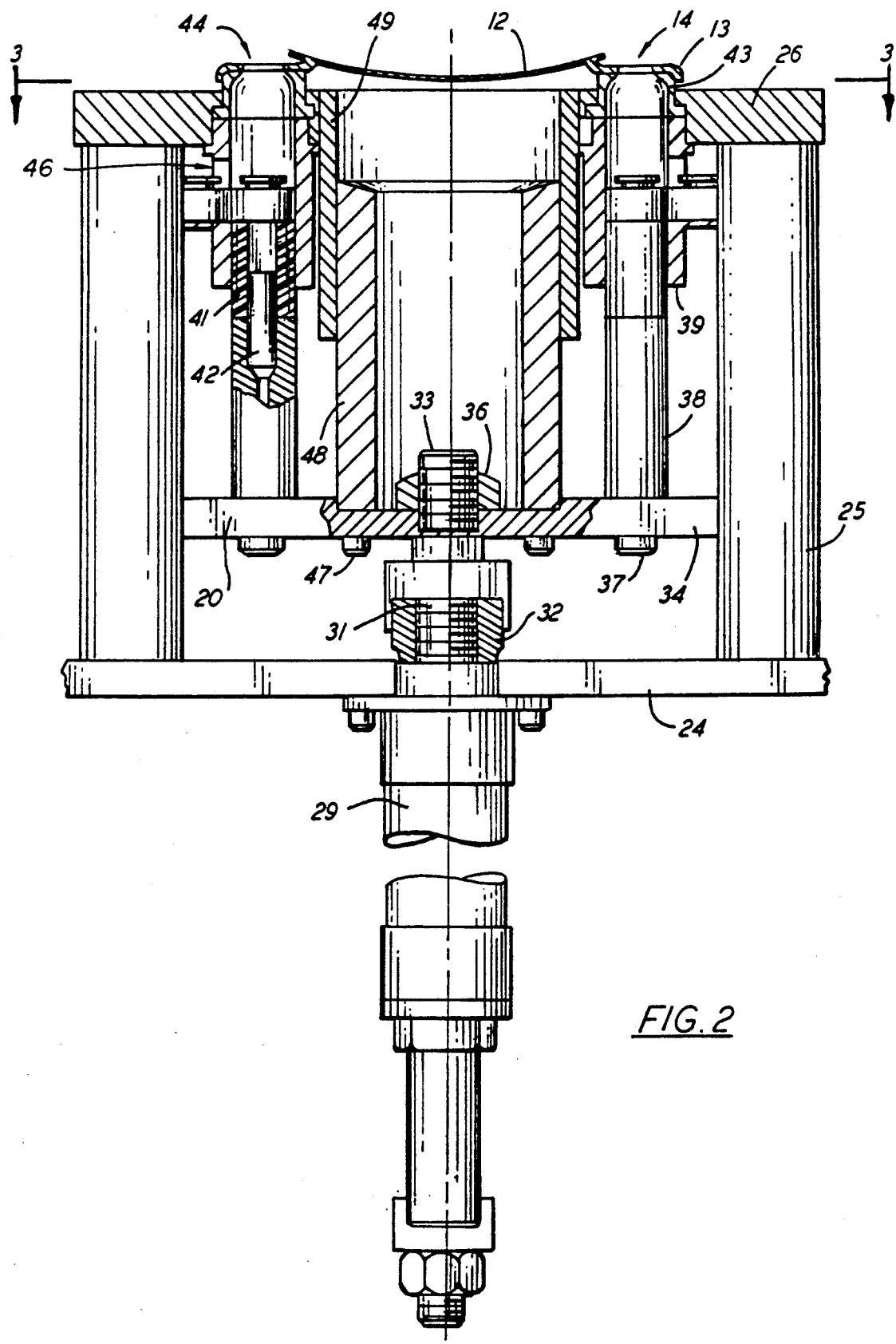
FIG. 2 is a front view of the grommet insertion portion thereof, with portions broken away to show structural detail.

The compressor is first placed with its four mounting legs 13 resting on the respective grommet funnels 43 as shown in FIG. 2. The grommets are advanced from the individual chutes 23 into the respective guide cylinders 39. The grommets 16 are then forced upwardly as described hereinabove, until the head 19 of the grommet passes through the hole 14 in the compressor base leg 13. At that point, the pusher rod 48 is at the point where its end engages the base 12 of the compressor 11 so that the compressor is lifted upwardly to thereby pull upwardly on the grommet head 19 and assist in pulling the body 17 thereof through the grommet funnels 43. The grommet insertion process is then complete as shown in FIG. 4, and the compressor is removed and the pusher plate 34 is again retracted to the position shown in FIG. 2 to commence the next cycle.

While the present invention has been disclosed with particular reference to a preferred embodiment, the concepts of this invention are readily adaptable to other embodiments, and those skilled in the art may vary the structure thereof without departing from the essential spirit of the present invention. For example, while the invention has been described in terms of apparatus having four upwardly extending guide cylinders and a central push rod, it may as well take other forms such as different numbers of horizontally disposed guide cylinders with or without a central push rod. Other variations will also occur to those skilled in the art, and it is contemplated that such variations are within the scope of the appended claims.

What is claimed:

1. Apparatus for installing, into an opening of a base structure, an elastomeric grommet having serially connected body, neck, and head portions, comprising:
   a cylinder for receiving said grommet and for guiding its coaxial movement toward a discharge end of said cylinder, said cylinder having a contracting portion leading to a discharge opening of diminished size;
   means for positioning a base structure against said cylinder discharge end, with its opening coaxially overlying said discharge opening;
   a piston slideably disposed in said cylinder; and
   power movement means for moving said piston into engagement with said grommet body and further toward said discharge end, such that said contracting portion acts to deform said grommet head and allows it to pass through said discharge opening and said base structure opening before it resumes its undeformed shape to thereby capture the grommet within said base structure opening.

2. The apparatus as set forth in claim 1 and including a grommet feed means for inserting said grommet into coaxial alignment with said cylinder, with said grommet head oriented towards said discharge end.

3. The apparatus as set forth in claim 2 wherein said grommet feed means includes an opening in the side of said cylinder, and conveyer means for conveying said grommet through said opening in a direction which is substantially normal to the axis of said cylinder.

4. The apparatus as set forth in claim 2 wherein said feed means comprises a chute with a conveyer means disposed therein.

5. The apparatus as set forth in claim 1 and including a push rod for engaging said base structure and lifting it off said cylinder discharge end after said grommet has been installed.

6. The apparatus as set forth in claim 5 wherein said push rod is driven by said power movement means, in unison with the movement of said piston.

7. The apparatus as set forth in claim 1 and including a plurality of said cylinders and pistons to accommodate substantially simultaneous insertion of respective grommets into a plurality of base structure openings.

8. The apparatus as set forth in claim 7 wherein said plurality of cylinders are substantially parallel.

9. The apparatus as set forth in claim 7 wherein said power movement means includes a push plate element which is attached to each of said plurality of pistons.

10. The apparatus as set forth in claim 9 wherein a push rod is attached to said push plate for engaging said base structure and lifting it off said cylinder discharge ends after said grommet heads have passed through said base structure openings.

11. An apparatus for simultaneously installing a plurality of elastomeric grommets into respective openings in the base structure of a compressor comprising:

a plurality of cylinders disposed in substantially parallel axis relationship with their relative spacings corresponding to those of the compressor base openings, said cylinders each having a converging portion leading to a diminished discharge opening at a cylinder discharge end;

grommet feed means for inserting grommets with body, neck, and head portions into said cylinder with said head portions being coaxially oriented toward said cylinder discharge end;

positioning means for positioning said compressor with its base structure engaging said cylinder discharge ends and with said base structure openings being in coaxial alignment with the respective said cylinder discharge openings;

a piston slideably disposed in each of said cylinders; and power movement means for moving said pistons into engagement with said grommet bodies and further toward said cylinder discharge ends to thereby deform and force said grommet heads serially through said cylinder converging portions, cylinder discharge openings, and compressor base structure openings, after which said grommet heads are allowed to return to their undeformed conditions to thereby capture said grommets in said base structure openings.

* * * * *